A. EMRICH.
MANUFACTURE OF EXPANSIBLE FINGER AND OTHER SMALL RINGS.
APPLICATION FILED MAR. 8, 1911.
1,000,244.
Patented Aug. 8, 1911.
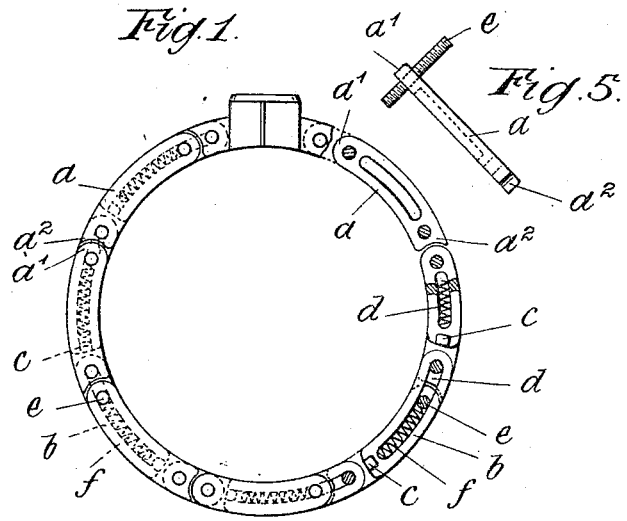
Inventor
Alfred Emrich

UNITED STATES PATENT OFFICE.

ALFRED EMRICH, OF PFORZHEIM, GERMANY.

MANUFACTURE OF EXPANSIBLE FINGER AND OTHER SMALL RINGS.

1,000,244. Specification of Letters Patent. Patented Aug. 8, 1911.

Application filed March 8, 1911. Serial No. 613,155.

*To all whom it may concern:*

Be it known that I, ALFRED EMRICH, manufacturer, a subject of the German Emperor, and resident of Pforzheim, in the Grand Duchy of Baden, Germany, with the post-office address Baumstrasse 22, have invented new and useful Improvements in the Manufacture of Expansible Finger and other Small Rings, of which the following is a specification.

This invention relates to finger rings and especially to expanding rings constructed on the principle of an expanding bracelet.

According to this invention the screws or bolts for holding together and spacing apart the links are formed from a length of threaded wire, the ends of which are cut off after it has been screwed into position.

The accompanying drawings show a finger ring constructed in accordance with this invention.

Figure 1 is an elevation in partial section. Fig. 2 is a section through part of the ring at right angles to the plane of Fig. 1. Fig. 3 is a perspective view of an intermediate member. Fig. 4 represents a portion of the ring in the expanded condition, partly in elevation and partly in section. Fig. 5 is a view of one member with the length of threaded wire passing through it.

It will be seen by Fig. 1 that the ring is formed as a link chain of pairs of links $a$ and $b$ of which the link $a$ has two plates inclosing the link $b$. One of the ends of the links $a$ is convex in shape, as shown by $a^1$, while the other one, $a^2$, is concave, so as to fit one into the other. The link $b$ (Fig. 3) is guided by means of one or two lateral studs $c$ which project from the sides thereof and engage in corresponding grooves $c^1$ in the plates of the link $a$, while the slot $d$ is guided on a pin $e$ fixed in the plates of the link $a$. A spring $f$ is arranged in the slot $d$ between the studs $c$ of the link $b$ and the inner end of the grooves $c^1$ of the link $a$ to draw the links $a$ and $b$ together elastically. This spring $f$ is preferably of a flat form, as shown by Fig. 2, so as to project beyond the sides of the link $b$ into the groove $c^1$ of the plates of the link $a$, thus serving as an additional guiding means for the link $b$. A difficulty is encountered in making this kind of chain link in the small sizes needed for finger-rings. The two plates $a$ are connected by pins $e$ (Fig. 2) which serve at the same time as guides and jointing bolts for the links $b$. The attachment of these bolts gives rise to considerable difficulty since they must be sufficiently low in cost on the one hand, and on the other an accurate spacing of the plates $a$ from one another is essential, and finally the ends of the bolts must not project, they must in fact be perfectly invisible to the eye when the outside has been coated with metal. The presence of the small springs $f$ also increases the difficulty of the work, more especially as the employment of any heat that would destroy their springiness is precluded. These difficulties are so great in the case of such small hinged joints as are needed for finger rings, for instance, that no expanding finger rings of the aforesaid kind have yet been made.

The new method of connection can of course also be applied to other rings that are not exactly finger rings but require the same fine work.

According to the present invention the two plates are secured together in a special way by the aid of screw bolts. The use of separate small screws however, is impracticable owing to the difficulty of making and handling them. Consequently the bolts are made in the form of threaded wires which after being inserted in the holes previously bored, in the plates, are cut off on the outside and can easily be filed down smooth. The method particularly adopted is to use for the bolts a wire that is considerably harder than the material of the chain links, this wire being used to cut the fine female thread in the chain link. Apart from greater ease in handling the wire, this method has the advantage that the rotation of the wire enables the distance between the cheeks to be nicely adjusted. When the wire has cut its way in, it is cut off at each side by cutting pincers, and the two ends are filed smooth.

What I claim and desire to secure by Letters Patent is:

1. In a ring, the combination of a plurality of links formed with a pair of plates, slotted links engaged by the plates, pins fixed in the plates and passing through the slots of the slotted links, and one end of the plates being concave and the other convex for permitting said links to fit into one another, substantially as described.

2. In a ring, the combination of a plurality of links formed with a pair of plates, slotted links engaged by the plates, pins fixed in the plates and passing through the slots of the slotted links, each slotted link having a lug on each face in alinement with the slot thereof, said plates being provided with grooves for receiving said lugs, and a spring in each slot and projecting into said grooves of the plates for drawing said links together, substantially as described.

In testimony, that I claim the foregoing as my invention, I have signed my name in presence of two witnesses, this 25th day of February 1911.

ALFRED EMRICH.

Witnesses:
ERNEST ENTENMANN,
FRIDA KLAIBER.